(12) United States Patent
Nebel (10) Patent No.: US 6,494,487 B1
(45) Date of Patent: Dec. 17, 2002

(54) STABILIZING JACK FOR RECREATIONAL VEHICLES

(76) Inventor: Michael W. Nebel, Rte. 3, Box 6-A, Smith Center, KS (US) 66967

( * ) Notice: Subject to any disclaimer, the term of this patent is extended or adjusted under 35 U.S.C. 154(b) by 8 days.

(21) Appl. No.: 09/824,068

(22) Filed: Apr. 2, 2001

Related U.S. Application Data (63) Continuation-in-part of application No. 09/315,187, filed on May 20, 1999, now Pat. No. 6,224,102.

(51) Int. Cl.$^7$ ................................................ B60S 9/02
(52) U.S. Cl. .............................. 280/765.1; 280/764.1; 254/424
(58) Field of Search ......................... 280/764.1, 763.1, 280/765.1, 766.1, 475; 254/424, 419, 425, DIG. 2, 10 R (56) References Cited

U.S. PATENT DOCUMENTS

| | | |
|---|---|---|
| 1,539,974 A | 6/1925 | Tucker |
| 2,747,836 A | 5/1956 | Sherman |
| 3,310,181 A | 3/1967 | Symmank |
| 3,345,038 A | 10/1967 | Taylor |
| 3,475,008 A | 10/1969 | Taylor |
| 3,565,396 A | 2/1971 | Spear |
| 3,767,226 A | 10/1973 | Stephens |
| 3,826,470 A | 7/1974 | Spear |
| 3,854,750 A | 12/1974 | Boehringer, Jr. |
| 3,870,276 A | 3/1975 | Phillips |
| 3,989,277 A | 11/1976 | Stahl |
| 4,103,869 A | 8/1978 | Mesny et al. |
| 4,146,250 A | 3/1979 | Denherder |
| 4,148,461 A | 4/1979 | Orth |
| 4,515,520 A | 5/1985 | Parquet et al. |
| 4,955,450 A | 9/1990 | Deinlein-Kalb et al. |
| 5,042,779 A | 8/1991 | Eden |
| 5,205,586 A | 4/1993 | Tallman |
| 5,348,330 A | 9/1994 | Few et al. |
| 5,488,788 A | 2/1996 | Durbin |
| 5,501,428 A | 3/1996 | Garceau |
| 5,547,220 A | 8/1996 | Lagsdin |
| 5,901,980 A | 5/1999 | Few et al. |
| 6,089,603 A * | 7/2000 | Ackley ................. 280/765.1 |
| 6,102,438 A * | 8/2000 | Few et al. ............. 280/763.1 |
| 6,224,102 B1 * | 5/2001 | Nebel .................... 280/765.1 |
| 2002/0053794 A1 * | 5/2002 | Fender ................... 280/766.1 |

* cited by examiner

Primary Examiner—Avraham Lerner
(74) Attorney, Agent, or Firm—Kent R. Erickson; Shughart Thomson & Kilroy PC (57) ABSTRACT

A stabilizing jack for vehicles comprises a pair of legs advanceable between retracted and extended positions by a drive assembly including a drive screw having left and right hand threaded sections. The drive screw is mounted on a slide frame which is slidably mounted to a base frame securable to a vehicle. Each leg is pivotally secured at a first end thereof to a screw follower threadably secured to a respective threaded section of the drive screw. When the legs are extended on uneven ground, one leg will engage the ground before the other preventing that leg from further downward advancement but causing the drive assembly to drive the slide frame in an opposite direction while the other leg continues to advance downward until it engages the ground.

26 Claims, 6 Drawing Sheets

STABILIZING JACK FOR RECREATIONAL VEHICLES

This application is a continuation-in-part of U.S. application Ser. No. 09/315,187 U.S. Pat. No. 6,224,102 filing date May 20, 1999 entitled Stabilizing Jack for Recreational Vehicles.

BACKGROUND OF THE INVENTION

The present invention relates to stabilizing jacks for recreational vehicles adapted to raise the recreational vehicle relative to its suspension to provide stability to the vehicle when parked.

A wide variety of stabilizing jacks have been developed for use in stabilizing recreational vehicles, trailers and the like when parked by raising the vehicle relative to its suspension system to prevent rocking and swaying of the recreational vehicle as an occupant moves around in the vehicle. For example, U.S. Pat. No. 4,103,869 discloses a stabilizing system utilizing four separate jacks mounted in the corners of the vehicle with each jack having a separate gearmotor for extending and retracting the leg of the jack. Raising and lowering of the jacks is controlled by an electronic switching system to selectively raise and lower one jack at a time to stabilize and level the vehicle.

Although stabilizing systems such as that shown in U.S. Pat. No. 4,103,869 do conveniently allow the user to raise and lower all four jacks from one location, the need for a separate motor for each jack leg significantly increases the cost of the stabilizing system. In addition, raising and lowering each jack leg independently makes it difficult to properly stabilize the vehicle. For example, with the leg of one of the rear jacks lowered into contact with the ground, as the leg of the other rear jack is lowered into contact with the ground to the point that it pushes upward on the vehicle body, it also lifts the opposite jack leg slightly off of the ground. Using such a system it is difficult to ever get all four jack legs touching the ground at the same time to provide the desired stability.

U.S. Pat. No. 3,870,276 discloses a stabilizing jack for recreational vehicles having a pair of jack legs which are raised and lowered using a single motor. The jack legs are mounted on a frame such that the legs are simultaneously moved downwardly into a stabilizing position beneath the vehicle with an equal force on both of the legs and such that both of the legs strike the ground before further force is applied to either leg to raise the vehicle, such as when the stabilizer is extended on uneven terrain. However, the usefulness of the stabilizing jack as shown in U.S. Pat. No. 3,870,276 is severely limited because the motor for each set of legs is mounted so as to extend downward from the vehicle. In this position, the motor and the stabilizing jack system are prone to damage during transport of the recreational vehicle because of clearance problems. In addition the configuration of the '276 patent limits the length of the legs such that the system may not be useable with current style coaches or trailers whose frames tend to sit higher off of the ground. The newer generation coaches sit higher off of the ground to accommodate slide out rooms and the like.

There remains a need for a relatively low cost stabilizing system which facilitates stabilizing of recreational vehicles and which may be driven by a motor.

SUMMARY OF THE INVENTION

The present invention comprises a stabilizing jack for vehicles having a pair of jack legs advanceable between retracted and extended or raised and lowered positions by a single drive assembly, wherein the drive assembly is mounted on a slide frame which is slidably mounted to a base frame. The base frame is securable to the frame of a vehicle such as a recreational vehicle to stabilize the vehicle when parked.

When the legs are lowered on uneven ground, one leg will engage the ground before the other preventing that leg from further downward advancement but causing the drive assembly to drive the slide frame in an opposite direction while the other leg continues to advance downward until it engages the ground. Once both legs engage the ground, the balanced forces acting through the legs prevents the slide frame from sliding relative to the base frame such that the legs push downward on the ground with equal pressure, pushing upward on the mounting frame and raising the vehicle.

In a preferred embodiment, the drive assembly comprises a drive screw having adjacent left and right hand threaded sections with a screw follower or trunnion secured to each threaded section. Each leg is pivotally secured at a first end thereof to one of the screw followers. Struts or leg braces are pivotally connected at one end to each leg, medially thereof, and are pivotally connected at opposite ends to the base frame at the ends closest the respective leg.

When the screw followers are positioned centrally relative to the drive screw or in close proximity to the transition between the left and right hand threaded sections, the legs are positioned in a retracted position relative to the slide frame and base frame. When the screw is rotated in a first direction, the screw followers advance outward relative to the screw, causing the legs to pivot downward or toward an extended position. When the screw is rotated in an opposite direction, the screw followers advance inward relative to the screw, causing the legs to pivot upward or toward the retracted position.

As the screw is rotated in the first direction and one leg engages the ground before the other, the engagement of that leg against the ground resists outward advancement of the screw follower attached to the leg at its upper end thereof relative to the ground, such that the screw and the slide frame advance in the opposite direction relative to the ground until the other leg touches the ground. Once both legs touch the ground, the equal and opposite forces acting on the slide frame generally prevent it from sliding relative to the base frame and the screw followers are forced outward against the resistance thereon, causing the base frame to push upward on the vehicle raising it relative to its suspension system.

The drive screw is preferably driven by a motor connected to the drive screw at one end thereof The motor is adapted to automatically shut off when the load thereon exceeds a selected amount, which occurs when the vehicle is raised sufficiently to stabilize the vehicle.

DETAILED DESCRIPTION OF THE INVENTION

Background and Environment

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Objects and advantages of this invention will become apparent from the following description taken in conjunction with the accompanying drawings wherein are set forth, by way of illustration and example, certain embodiments of this invention.

Figure 1:
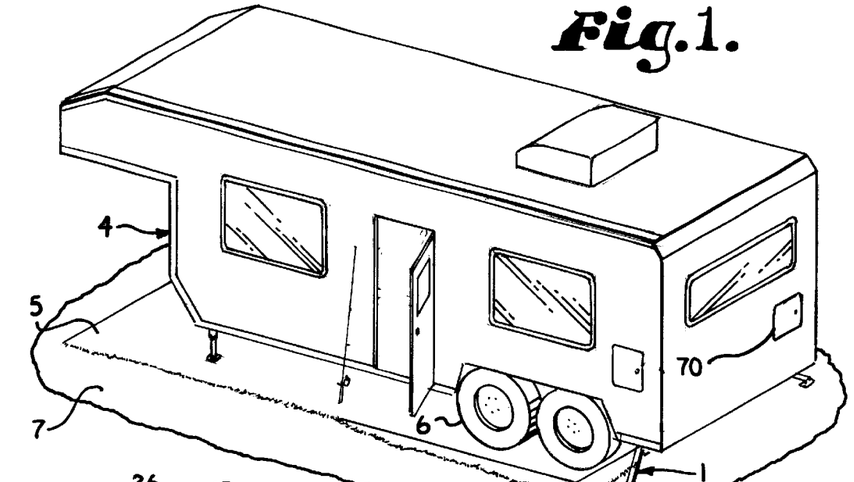
FIG. 1 is a perspective view of a recreational vehicle parked on a relatively level pad and having a stabilizing jack secured to a rear end thereof and deployed on uneven ground and supporting a rear end of the recreational vehicle.
Figure 2:
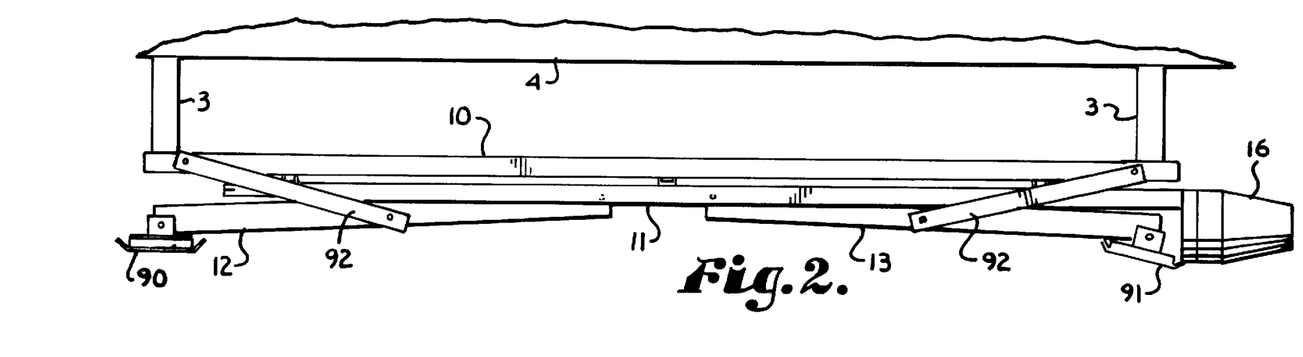
FIG. 2 is an enlarged and fragmentary, rear elevational view showing the stabilizing jack of the present invention secured to frame members of the recreational vehicle with the stabilizing jack in a fully retracted position.
Figure 3:
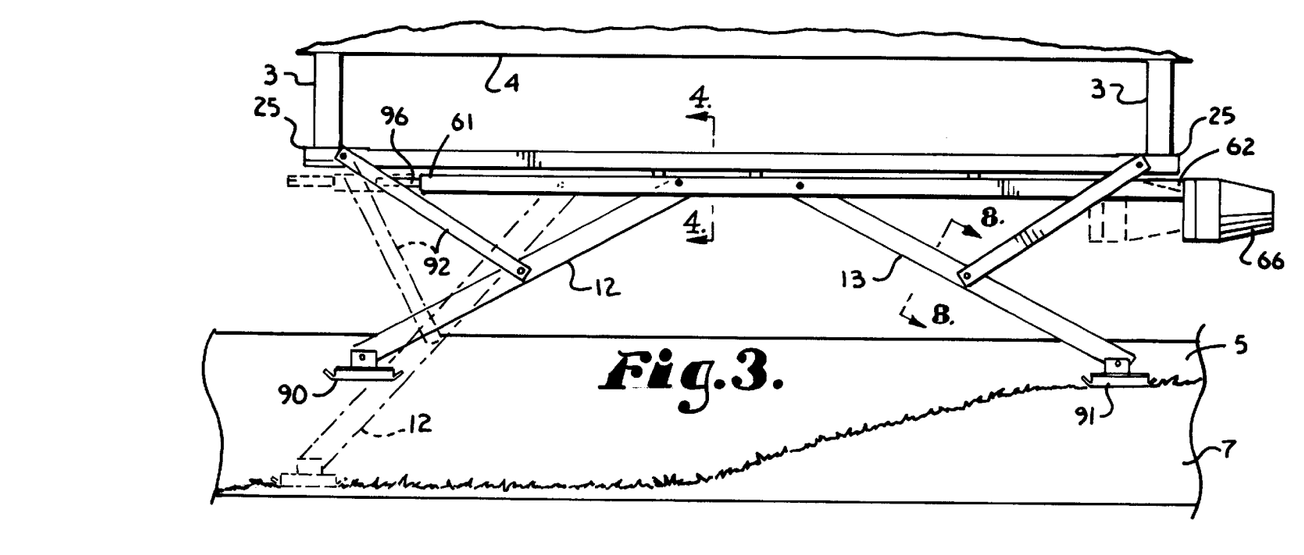
FIG. 3 is a view similar to FIG. 2 on a reduced scale and showing the stabilizing jack advancing to an extended position on uneven terrain.

Referring to the drawings in more detail, and in particular FIGS. 1–3, the reference numeral 1 refers to a stabilizing jack of the present invention shown secured to frame members 3 of a recreational vehicle 4 parked on a pad 5. The recreational vehicle 4 is supported on a spring suspension system not shown connected to wheels 6. The suspension system is adapted to provide a smooth ride during travel. However, when the recreational vehicle 4 is parked, the suspension system allows the vehicle 4 to rock back and forth and bounce up and down relative to the wheels 6 as a passenger moves around in the vehicle 4.

The stabilizing jack 1 is adapted for raising the vehicle 4 upward relative to the wheels 6 to take some of the weight of the vehicle off of the suspension system to stabilize the vehicle 4 and prevent rocking and bouncing of the parked vehicle 4. For fifth wheel type recreational vehicles 4, as shown in FIG. 1, one stabilizing jack 1 is mounted across the rear end of the vehicle 4. In motor coach type recreational vehicles with an integral cab (not shown), a second stabilizing jack 1 is mounted across the front end of the vehicle 4. The stabilizing jack is not intended for use in leveling the recreational vehicle 4. The vehicle 4 is preferably parked on level ground such as a level pad 5 prior to stabilization. However, as shown in FIGS. 1 and 3, the ground 7 around the pad 5 on which the stabilizer jack 1 is to be supported, may not be level.

First Embodiment

Figure 4:
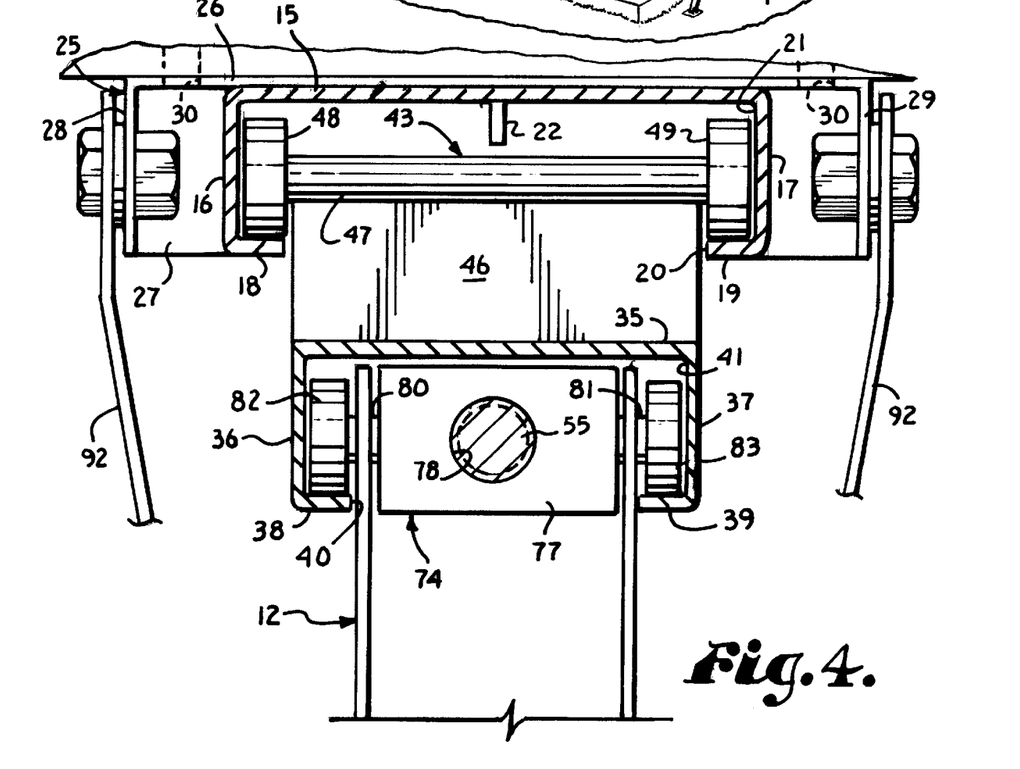
FIG. 4 is an enlarged and fragmentary cross-sectional view taken along line 4—4 of FIG. 3.

Referring to FIGS. 2–4, the stabilizing jack 1 comprises a channel-type mounting frame, base frame or member 10, a channel-type slide frame or member 11 slidably secured to and below the mounting frame 10, and first and second legs 12 and 13 connected to the slide frame 11 and advanceable between a retracted and extended orientation or a raised and lowered orientation relative thereto. As best seen in FIG. 4, the mounting frame 10 is formed from an elongated downwardly opening C-channel comprising a web 15, downwardly extending sidewalls 16 and 17, and inwardly extending track flanges 18 and 19 with a guide slot 20 extending therebetween and opening to an interior space or channel 21. A rib 22 is welded to and extends downward from the web 15 of mounting frame 10 into the channel 21.

A mounting bracket 25 is secured to each end of the mounting frame 10 for use in bolting the mounting frame 10 to the frame members 3 of the recreational vehicle 4. The mounting bracket 25 includes a top plate 26, downwardly extending end flange 27, and downwardly extending side flanges 28 and 29. The top plate 26 is wider than the web 15 of mounting frame 10. The mounting brackets 25 are welded to the mounting frame 10 on opposite ends thereof, such that the top plate 26 rests against the web 15 and the downwardly extending end flange 27 of each mounting bracket 25 abuts against a respective end of the mounting frame 10. Bolt holes 30 extend through the top plate 26 of each mounting bracket 25 on opposite sides of the mounting frame web 15. Corresponding holes are drilled into the frame members 3 of the recreational vehicle 4 to permit the stabilizing jack 1 to be bolted thereto.

The slide frame 11 is also formed from an elongated downwardly opening C-channel member comprising a web 35, downwardly extending sidewalls 36 and 37, and inwardly extending track flanges 38 and 39 with a guide slot 40 extending therebetween opening to an interior space or channel 41. In the embodiment shown, the slide frame 11 is narrower than the mounting frame 12 with the width of the slide frame 11 generally corresponding to the width of the mounting frame guide slot 20. It is foreseeable that the relative widths of the mounting frame 10 and slide frame 11 could be varied.

The slide frame 11 is slidably connected to the mounting frame 10 by three roller assemblies 43. Each roller assembly 43 comprises a base 46 formed from a length of square tubing welded to the upper surface of the web 35 of slide frame 11. An axle 47 is welded lengthwise to an upper surface of the base 46 and rollers 48 and 49 are rotatably mounted on opposite ends of the axle 47 beyond the ends of the base 46. The spacing of the rollers 48 and 49 corresponds to the spacing of the mounting frame track flanges 18 and 19 and the bases 46 of the roller assemblies 43 are narrower than the mounting frame guide slot 20. The axles 47 of roller assemblies 43 extend in closely spaced relation below the rib 22.

The slide frame 11 is slidably secured to the mounting frame 10 by sliding or rolling the rollers 48 and 49 onto the mounting frame track flanges 18 and 19 from one end of the mounting frame 10, through a notch, not shown, in the mounting bracket end flange 27, such that the bases 46 extend through the guide slot 20 and the slide frame 11 is supported below the mounting frame 10 with the rollers 48 and 49 supported on the mounting frame track flanges 18 and 19.

Figures 5, 6, 7, 8:
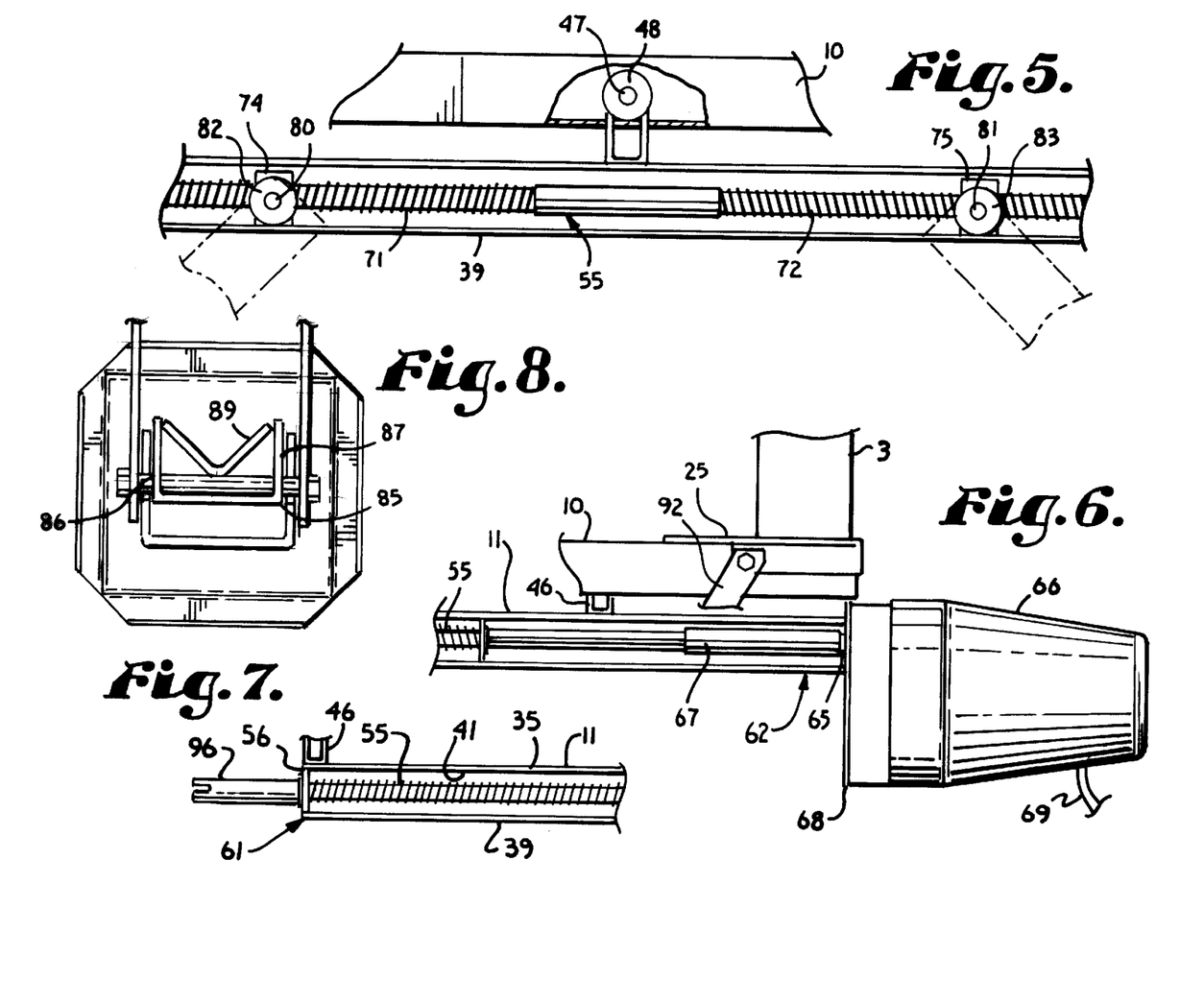
FIG. 5 is an enlarged and fragmentary rear elevational view of the stabilizing jack as generally shown in FIG. 3 with portions broken away to show interior detail.
FIG. 6 is an enlarged and fragmentary rear elevational view of the right side of the stabilizing jack as generally shown in FIG. 3 with portions broken away to show interior detail.
FIG. 7 is an enlarged and fragmentary rear elevational view of the left side of the stabilizing jack as generally shown in FIG. 3 with portions broken away to show interior detail.
FIG. 8 is an enlarged and fragmentary cross-sectional view taken generally along line 8—8 of FIG. 3.

As best seen in FIGS. 5–7, a drive screw 55 is rotatably mounted lengthwise within the slide frame 11 on first and second bearing plates 56 and 57. Referring to FIGS. 6 and 7, the first bearing plate 56 extends across the channel 41 of slide frame 11 at a first end 61 thereof. The second bearing plate 57 extends across the channel 41 of slide frame 11 in inwardly spaced relation from a second end 62 of the slide frame 11. The drive screw 55 is connected to and driven by a drive shaft 65 of motor 66 by linkage 67. The motor 66 is mounted on motor mounting plate 68 which is welded to the second end 62 of slide frame 11.

The motor 66 and the motor mounting plate 68 are mounted relative to the slide frame 11 such that the motor 66 extends completely below the mounting frame 10 such that the motor 66 may slide beneath the mounting frame 10 as the slide frame 11 slides relative to the mounting frame 10. The motor 66 is electrically connected by cord 69 to a battery and a switching system which permits reversible rotation of the drive screw 55. The switching system may be located in a wide variety of positions and is preferably located behind an access panel, such as access panel 70, on the outside of the vehicle 4 close to the stabilizer jack 1 to facilitate viewing of the stabilizing jack 1 when the first and second legs 12 and 13 are being raised and lowered.

The switching system is preferably of the type having a switch lever which is normally biased to an off position and which may be urged to a first switch position or condition generally marked as an extend position, in which a circuit connecting the motor 66 to the battery is closed causing the motor 66 to rotate the drive shaft 65 in a first direction causing the legs 12 and 13 to lower as discussed in more detail below. The switch lever may also be urged to a second switch position or condition generally marked as a retract position, in which the polarity of the connections between the battery and the motor 66 are reversed and closed causing the motor 66 to rotate the drive shaft 65 in an opposite direction causing the legs 12 and 13 to lower as discussed in more detail below.

The drive screw 55 includes a first threaded section 71 and a second threaded section 72 having right and left handed threads respectively. First and second trunnions 74 and 75 are threadingly secured to the first and second threaded sections 71 and 72 respectively of the drive screw 55. As best seen in FIG. 4, each trunnion 74 and 75 includes a base or block 77 with a threaded bore 78 extending therethrough for receiving the first or second threaded sections 71 or 72 of the drive screw 55. First and second axle pins 80 and 81 are press fit into a bore extending through the block 77 transverse to the threaded bore 78. The axle pins 80 and 81 are press fit into opposite sides of the block 77 and have first and second rollers 82 and 83 respectively mounted on outer ends thereof. The first and second rollers 82 and 83 are supported on the slide frame track flanges 38 and 39 respectively.

An upper end 86 of each leg 12 and 13 is pivotally mounted to trunnions 74 and 75 respectively. As best seen in FIG. 8, each leg 12 and 13 is formed from a U-shaped channel member 85 with upstanding sidewalls 86 and 87. The sidewalls 86 and 87 are pivotally supported on the axle pins 80 and 81 respectively which extend through bores in the sidewalls 86 and 87. The sidewalls 86 and 87 are supported on the axle pins 80 and 81 between the block 77 and the rollers 82 and 83 respectively. A reinforcing member 89 comprising a length of angle iron is welded into the U-shaped channel member 85 along approximately the lower two thirds thereof to strengthen the legs 12 and 13.

Feet 90 and 91 are pivotally secured to the distal ends of leg 12 and 13 respectively. A pair of struts or leg braces 92 are pivotally secured at first ends 93 thereof to each leg 12 and 13 generally medially thereof and on opposite sides. Second ends 94 of the struts are pivotally secured to the side flanges 28 and 29 of the mounting bracket 25 positioned closest thereto. Referring to FIG. 8, a manual crank fitting 96 is formed on or secured to the end of the drive screw 55 opposite the motor 66 for engagement by the end of a hand crank (not shown) to permit manual rotation of the drive screw 55 if electrical power is not available.

Operation

Referring to FIG. 2, the stabilizing jack 1 is shown in a fully retracted position, wherein the trunnions 74 and 75 are positioned proximate the center of the drive screw 55 or the transition between the left and right hand threaded sections 71 and 72 of the drive screw 55. In the retracted position, the legs 12 and 13 are generally pivoted upward in closely angled relation to the slide frame 11 due to the restraining nature of the struts 92, and the slide frame 11 is generally centrally supported relative to the mounting frame 10.

To lower the legs 12 and 13, an operator urges the switch lever to the extend position, activating the motor 66 and rotating the drive screw 55 in a first direction causing the first and second trunnions 74 and 75 to move outward, apart from one another along the opposingly threaded first and second threaded sections 71 and 72 of the drive screw 55. Outward advancement of the trunnions 74 and 75 causes the attached legs 12 and 13 respectively to pivot downward relative to slide frame 11 at the same rate with the slide frame 11 generally remaining stationary relative to mounting frame 10. If the foot of one leg, such as foot 91 of leg 13, engages the ground 7 first, due to uneven ground as generally shown in FIG. 3, the contact between the foot 91 and ground 7 generally provides resistance to further pivoting of leg 13 relative to slide frame 11 and therefore resists outward advancement of trunnion 75. Until the other foot, foot 90 of leg 12, engages the ground 7, further rotation of the drive screw 55 in the first direction causes the slide frame 11 to be driven or slide in the opposite direction as the outward path of travel of the trunnion 75. As shown by phantom lines in FIG. 3, the slide frame 11 slides to the left once foot 91 of leg 13 engages the ground 7 and until foot 90 of leg 12 engages the ground. As the slide frame 11 slides to the left, the trunnion 74, connected to leg 12 which has not yet touched the ground 7, continues to travel outward or to the left in FIG. 3, causing leg 12 to continue to pivot downward until the foot 90 on leg 12 touches the ground 7. Once the feet 90 and 91 of both legs 12 and 13 are advanced into contact with the ground 7, the contact between the legs 12 and 13 and the ground 7, generally prevents the slide frame 11 from sliding in either direction.

Continued rotation of the drive screw 55 in the first direction, once both legs 12 and 13 are in contact with the ground, then causes outward advancement of trunnions 74 and 75 causing the legs 12 and 13 to pivot downward at the same rate raising the vehicle 4 upward relative to its suspension system. The motor 66 is of a type which will automatically shut off when the load thereon exceeds a predetermined amount. In a preferred embodiment, the vehicle 4 will be raised approximately ¾ of an inch relative to its suspension system before the load on the motor 66 causes the motor 66 to automatically shut off.

Once both legs 12 and 13 are advanced into contact with the ground 7 and the jack 1 begins lifting upward on the vehicle 4, the blocks 77 of trunnions 74 and 75 will be pushed upward against an upper, inner surface of slide frame 11. The blocks 77 of trunnions 74 and 75 will continue to slide relative to the upper, inner surface of the slide frame 11, but the blocks 77 prevent bending of the drive screw 55 due to the forces acting thereon. Similarly the bases 46 and axles 47 of the roller assemblies 43 will be advanced upward against the rib 22. The fictional forces between the rib 22 and axles 47 resists sliding of the slide frame 11 relative to the mounting frame 10.

Once the vehicle 4 is raised slightly relative to its suspension and wheels 6, the vehicle is sufficiently stabilized to prevent rocking and bouncing as an occupant moves around in the vehicle 4. When the vehicle 4 needs to be moved. The operator urges the switch lever to a retract position which reverses the direction of rotation of the drive screw 55, causing the trunnions 74 and 75 to advance inward toward a center of the screw 55 (or the point of transition between the opposingly threaded sections 71 and 72) causing the legs to pivot upward to the retracted position.

Second Embodiment

Figure 9:
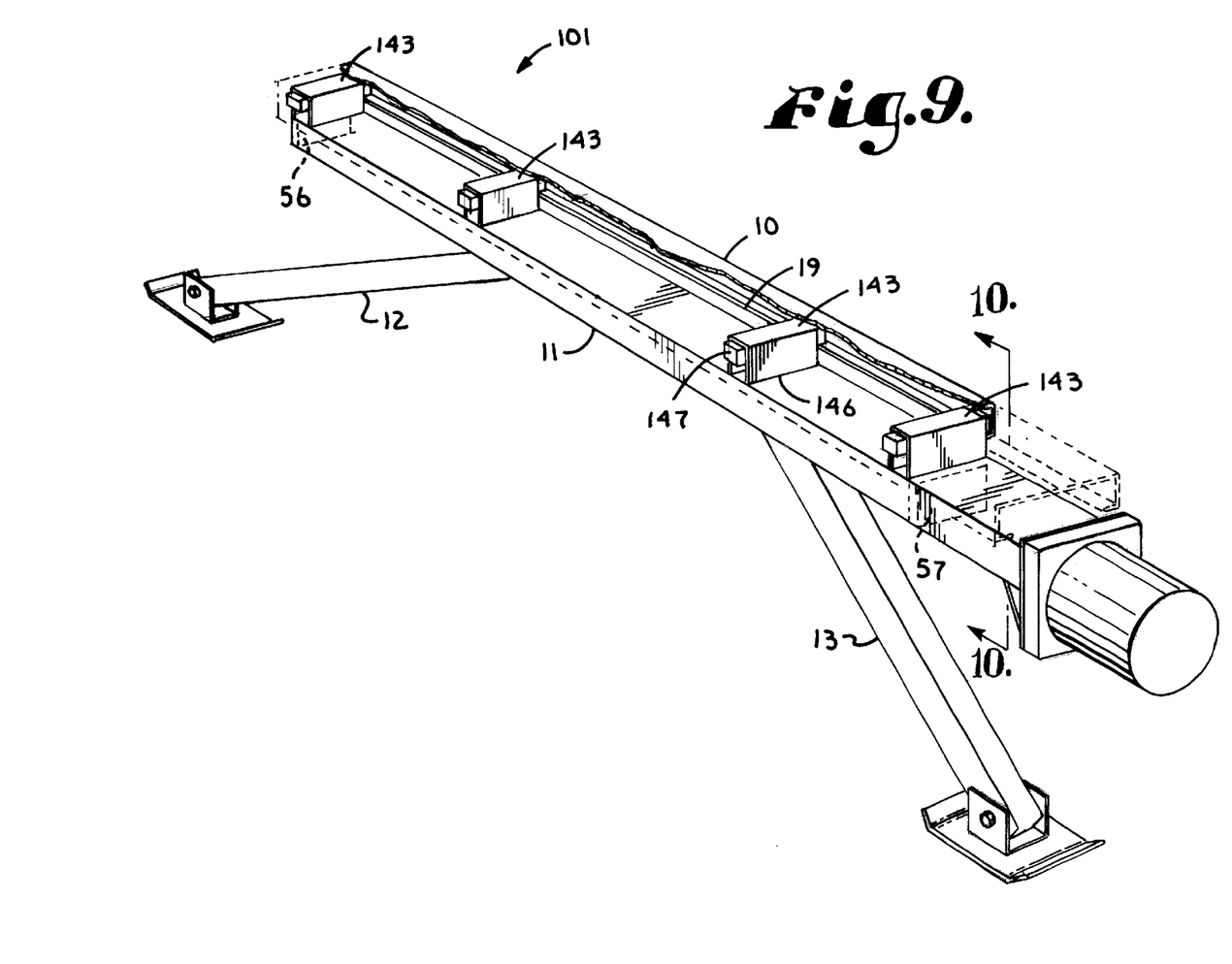
FIG. 9 is a fragmentary prospective view of a second embodiment of the stabilizing jack.
Figure 10:
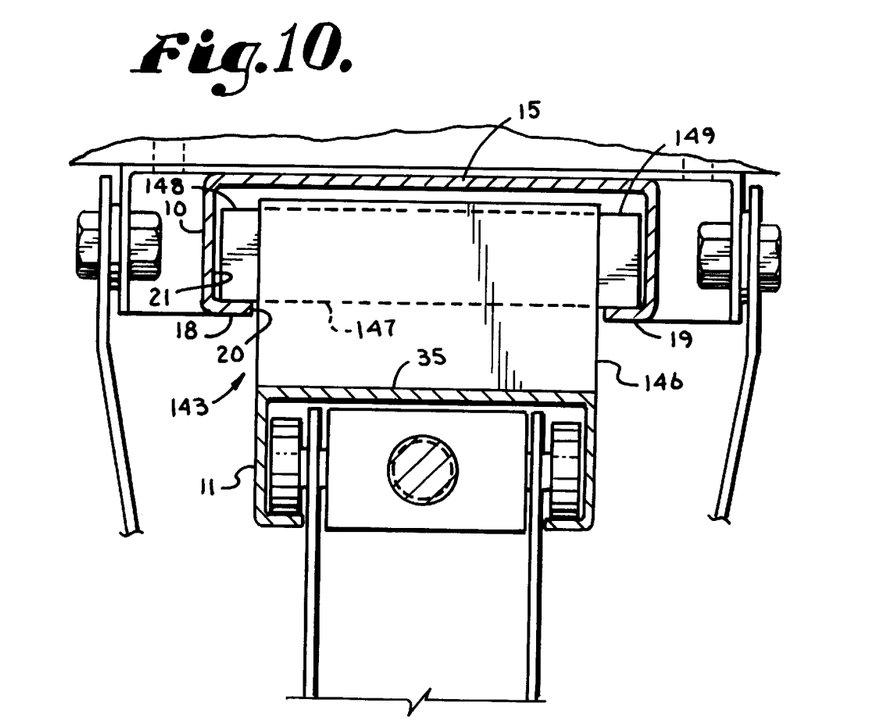
FIG. 10 is an enlarged and fragmentary cross-sectional view taken along line 10—10 of FIG. 9.

A second embodiment of the present invention, stabilizing jack 101, is substantially similar the stabilizing jack 1 except that the three roller assemblies 43 which connect the slide frame 11 to the mounting frame 10 are replaced by four glide block assemblies 143 as shown in FIGS. 9 and 10. Each glide block assembly 143 comprises a base 146 formed from a length of rectangular tubing welded transversely to the upper surface of the web 35 of slide frame 11. Each base 146 has a length which is slightly less than the width of the guide slot 20 of the stationary track 10 such that the base 146 can extend upwardly from the slide track 11 through the guide slot 20 and into the channel 21. A glide block 147 having a square cross-section is inserted lengthwise through the tubular base 146 such that opposing end portions 148 and 149 thereof extend outwardly beyond the ends of the base 146 and into sliding engagement with the mounting frame track flanges 18 and 19 (See FIG. 10). The glide blocks 147 have a generally square cross-section and can be composed of square steel tubing (having a relatively smooth finish), blocks of polytetrafluoroethylene (PTFE) or other ultra high molecular weight (UHMW) plastic, or other suitable materials. The end portions 148 and 149 of the glide blocks 147 slide along the upper surfaces of the respective flanges 18 and 19 to allow relative movement between the slide track 11 and the stationary track 10.

The glide block assemblies 143 are spaced along the slide frame 11 as shown in FIG. 9. A respective one of the glide block assemblies 143 is positioned proximate each of the drive screw bearing plates 56 and 57, with the other two assemblies 143 located intermediately therebetween. The positions of the intermediate assemblies 143 are selected to bear the upward force exerted by the legs 12 and 13 when the stabilizing jack 101 is supporting the vehicle 4. In this load supporting position, the upper surfaces of the glide block bases 146 bear against the lower surface of the web 15 to provide stable support for the vehicle 4.

Third Embodiment

Figure 11:
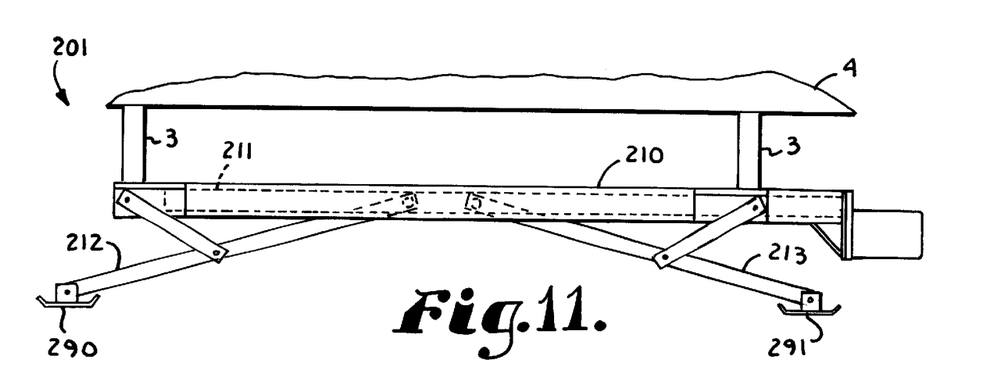
FIG. 11 is a rear elevational view showing a third embodiment of the stabilizing jack of the present invention secured to frame members of the recreational vehicle with the stabilizing jack in a nearly retracted position.
Figure 12:
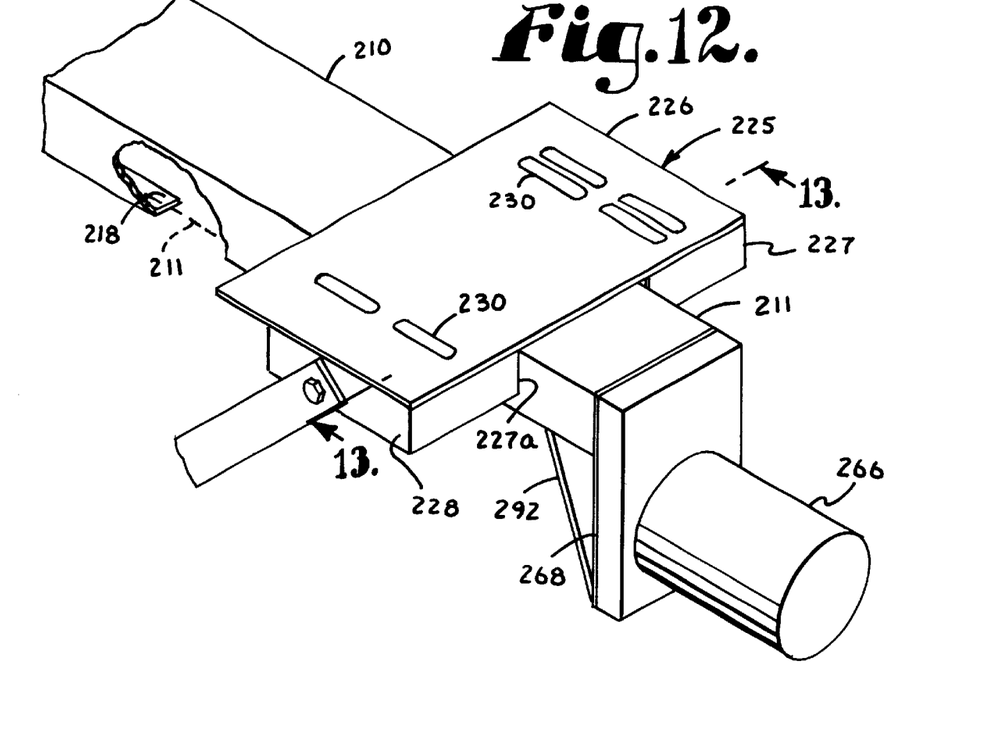
FIG. 12 is an enlarged and fragmentary perspective view of the third embodiment of the stabilizing jack.
Figure 13:
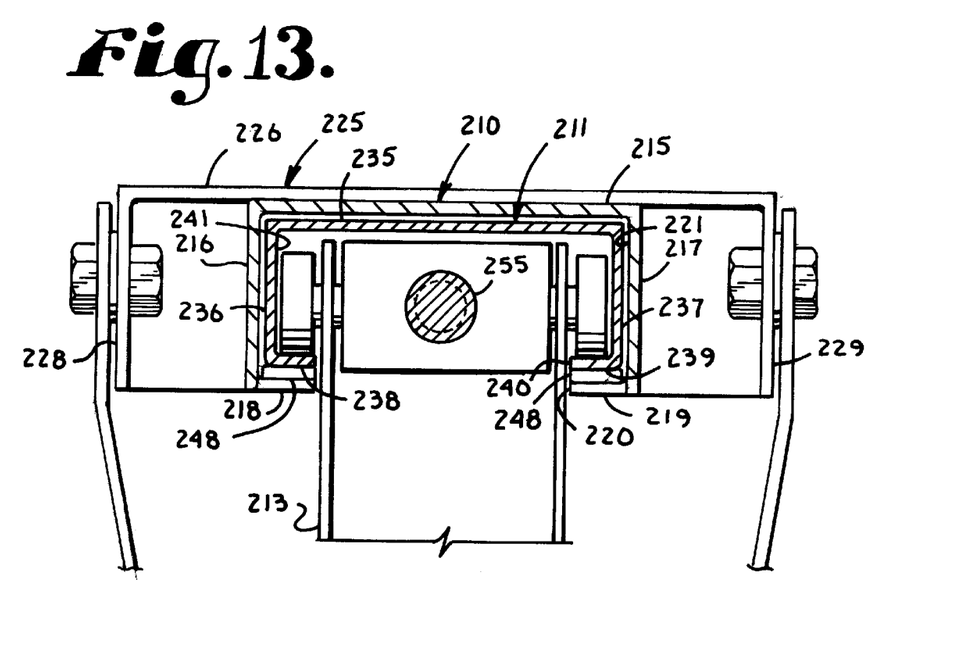
FIG. 13 is an enlarged and fragmentary cross-sectional view taken along line 13—13 of FIG. 12.

A third embodiment of the present invention, stabilizing jack 201, is shown in FIGS. 11–13. As is the case with the stabilizing jack 1, the stabilizing jack 201 includes a channel-type stationary base frame or track 210, and a channel-type slide frame or sliding frame member 211 slidably connected to the stationary track 210, however unlike the corresponding parts of the stabilizing jack 1, the slide frame 211 of the stabilizing jack 201 is positioned inside of the stationary track 210 as opposed to being suspended below it. First and second legs 212 and 213 are connected to the slide frame 211 and advanceable between retracted and extended positions relative thereto.

As best seen in FIG. 13, the stationary track 210 is formed from an elongated downwardly opening C-channel comprising a web 215, downwardly extending sidewalls 216 and 217, and inwardly extending track flanges 218 and 219 with a guide slot 220 extending therebetween and opening to an interior space or channel 221. It is foreseen that the track flanges 218 and 219 could be connected directly to a frame member of a recreational vehicle and supported therebelow by sidewalls 216 and 217 without an interconnecting surface or web, the upper surface of the structure being defined by the frame member.

A mounting bracket 225 is secured to each end of the stationary track 210 for use in bolting the stationary track 210 to the frame members 3 of the recreational vehicle 4. The mounting bracket 225 includes a top plate 226, downwardly extending end flange 227, and downwardly extending side flanges 228 and 229. The top plate 226 is wider than the web 215 of stationary track 210. The mounting brackets 225 are welded to the stationary track 210 on opposite ends thereof, such that the top plate 226 rests against the web 215 and the downwardly extending end flange 227 of each mounting bracket 225 abuts against a respective end of the stationary track 210. Each end flange 227 includes a notch or opening 227a aligned with the channel 221 of the stationary track 210 through which the slide frame 211 can slide. Bolt holes or slots 230 extend through the top plate 226 of each mounting bracket 225 on opposite sides of the mounting frame web 215. Corresponding holes (not shown) are drilled into the frame members 3 of the recreational vehicle 4 to permit the stabilizing jack 201 to be bolted thereto.

The slide frame 211 is also formed from an elongated downwardly opening C-channel member comprising a web 235, downwardly extending sidewalls 236 and 237, and inwardly extending track flanges 238 and 239 with a guide slot 240 extending therebetween opening to an interior space or channel 241. The web 235 of the slide frame 211 is of a width that is less than the width of the channel 221 of the stationary track 210 but greater than the width of the guide slot 220 of the stationary track 210. The sidewalls 236 and 237 of the slide frame 211 are somewhat shorter than the height of the channel 221 of the stationary track 210.

The slide frame 211 is slidably positioned inside of the channel 221 of the stationary track 210 with the web 235 proximate the web 215 of the stationary track 210. Bearings 248, formed in strips and manufactured of polytetrafluoroethylene (PTFE) or other ultra high molecular weight (UHMW) plastic are interposed between the flanges 238 and 239 of the slide frame 211 and the respective flanges 218 and 219 of the stationary track 210 to prevent metal-to-metal contact therebetween and promote smooth sliding movement of the slide frame 211 relative to the stationary track 210. The bearings 248 as shown may also be referred to as slide bearings or slider blocks or greaseless bearings 248 are fixedly connected either to the slide frame 211 or to the stationary track 210. It is foreseen that separate bearings 248 could be attached to each set of flanges 238 and 239 and 218 and 219. It is also foreseen that various lubricants could be utilized to facilitate sliding of the channel members relative to one another.

The legs 212 and 213 are connected to the stabilizing jack 201 in the same manner as the legs 12 and 13 of the stabilizing jack 1 and include respective feet 290 and 291. The legs 212 and 213 are moved between raised and lowered positions via a drive screw 255 identical to the drive screw 55 of the stabilizing jack 1. The drive screw 255 is driven by a motor 266 which is mounted on a motor mounting plate 268 which is welded to one end of slide frame 211.

As best seen in FIG. 12, with respect to flange 218, the flanges 218 and 219 are removed from or are not formed on a portion of the stationary track 210 proximate the motor mounting plate 268 so that the motor mounting plate 268 and attached motor 266 can pass into the channel 221 as the slide frame 211 slides relative to the mounting frame 210. The motor 266 may be electrically connected to the recreational vehicle 4 in the same manner as the motor 66 of the stabilizing jack 1 described above.

The stabilizing jack 201 further includes a deflector plate 292 which is welded between the motor mounting plate 268 and the flanges 228 and 229 of the slide frame 211 at an angle so as to present an inclined surface to the outboard end of the leg 213 and the attached foot 291 as the leg 213 moves from the raised position to the lowered position. The deflector plate 292 prevents the leg 213 from becoming stuck on the motor mounting plate 268 as it moves into the lowered position by guiding the leg 213 past the plate 268. If the deflector plate 292 were not present, the motor mounting plate 268 could be bent or otherwise damaged by contact with the leg 213. As such, the deflector plate 292 adds an important protective feature to the stabilizing jack 201 and is also recommended for use with the stabilizing jacks 1 and 101.

It is to be understood that while certain forms of the present invention have been illustrated and described herein, it is not to be limited to the specific forms or arrangement of parts described and shown. For example, it is foreseen that the track flanges 218 and 219 could be connected directly to a frame member of a recreational vehicle and supported therebelow by sidewalls 216 and 217 without an interconnecting surface or web, the upper surface of the structure being defined by the frame member. In addition, it is foreseen that the web, the sidewalls or the track flanges of the channel members do not have to be continuous.

What is claimed and desired to be secured by Letters Patent is as follows:

1. A stabilizing jack for use with a vehicle comprising:
   a) a stationary track member securable to said vehicle, said stationary track member having first and second track flanges;
   b) a sliding frame member slidably secured to said stationary track member and slidably supported on said first and second track flanges;
   c) a drive screw rotatably mounted to said sliding frame member and having a left hand threaded section and a right hand threaded section;
   d) a first screw follower threadingly secured to said left hand threaded section of said drive screw and a second screw follower threadingly secured to said right hand threaded section of said drive screw for linear advancement therealong upon rotation of said drive screw;
   e) a motor mounted to said sliding frame member at a first end thereof and drivingly engaging said drive screw for rotation of said drive screw; and
   f) first and second legs pivotally mounted at first ends thereof to said first and second screw followers respectively such that linear advancement of each of said first and second screw followers between a first position and a second position, through rotation of said drive screw, pivots said first and second legs respectively between a retracted position and an extended position.

2. The stabilizing jack as in claim 1, wherein said sliding frame member is supported below said stationary track by a connector, a portion of said connector extending above and supported on said first and second track flanges and slidable relative thereto such that said sliding track member slides relative to said stationary track member in parallel relation therebelow.

3. The stabilizing jack as in claim 2, wherein said connector comprises:
   a) an upright member extending upwardly from said sliding track member to an upper end located above said first and second track flanges of said stationary track member;
   b) an axle connected to said upper end of said upright member; and
   c) a pair of rollers rotatably mounted on said axle, each of said rollers being rollable on a respective one of said first and second track flanges.

4. The stabilizing jack as in claim 2, wherein said connector comprises:
   a) an upright member extending upwardly from said sliding track member to a point above said first and second track flanges of said stationary track member, said upright member having a generally horizontal aperture passing therethrough, at least a portion of said aperture being above said first and second track flanges; and
   b) a glide block extending through said aperture, said glide block having first and second end portions extending outwardly from said upright member in opposed directions, each of said first and second end portions having a lower surface in slidable contact with a respective one of said first and second track flanges.

5. The stabilizing jack as in claim 4, wherein said glide block is a block of ultra high molecular weight plastic.

6. The stabilizing jack as in claim 4, wherein said glide block is a length of square steel tubing.

7. The stabilizing jack as in claim 1, wherein:
   a) said sliding frame member comprises an elongated channel member including a web with opposed sidewalls depending therefrom and third and fourth track flanges extending inward from lower ends of said sidewalls in spaced apart relation to form a second guide slot extending therebetween; and
   b) said sliding frame member is positioned above said first and second track flanges of said stationary track member such that said third and fourth track flanges are slidably supported on said first and second track flanges.

8. The stabilizing jack as in claim 7, and further including bearings interposed between said first and second track flanges of said stationary track member and the respective third and fourth track flanges of said sliding frame member.

9. The stabilizing jack as in claim 8 wherein said bearings are composed of ultra high molecular weight plastic.

10. A stabilizing jack for use with a vehicle comprising:
    a) a stationary track member securable to said vehicle, said stationary track member comprising a first elongated channel member including a first web with first and second sidewalls depending therefrom and first and second track flanges extending inward from lower ends of said first and second sidewalls in spaced apart relation to form a first guide slot extending therebetween, said first and second track flanges each having an upper surface;
    b) a sliding track member supported below said stationary track by a connector, a portion of said connector extending above and supported on said first and second track flanges and slidable relative thereto such that said sliding track member slides relative to said stationary track member in parallel relation therebelow;

c) first and second linear actuators mounted to said sliding track member below said stationary track member; and d) first and second legs pivotally mounted at first ends thereof to said first and second linear actuators respectively such that advancement of each of said first and second linear actuators between a first position and a second position pivots said first and second legs respectively between a retracted position and an extended position.

11. The stabilizing jack as in claim 10, wherein said connector comprises:

a) an upright member extending upwardly from said sliding track member to an upper end located above said first and second track flanges of said stationary track member;

b) an axle connected to said upper end of said upright member; and c) a pair of rollers rotatably mounted on said axle, each of said rollers being rollable on a respective one of said first and second track flanges.

12. The stabilizing jack as in claim 10, wherein said connector comprises:

a) an upright member extending upwardly from said sliding track member to a point above said first and second track flanges of said stationary track member, said upright member having a generally horizontal aperture passing therethrough, at least a portion of said aperture being above said first and second track flanges; and b) a glide block extending through said aperture, said glide block having first and second end portions extending outwardly from said upright member in opposed directions, each of said first and second end portions having a lower surface in slidable contact with a respective one of said first and second track flanges.

13. The stabilizing jack as in claim 12, wherein said glide block is a block of ultra high molecular weight plastic.

14. The stabilizing jack as in claim 12, wherein said glide block is a length of square steel tubing.

15. The stabilizing jack as in claim 10 wherein said first and second linear actuators comprise:

a) a drive screw rotatably mounted to said sliding track member and having a left hand threaded section and a right hand threaded section;

b) a first screw follower threadingly secured to said left hand threaded section of said drive screw and a second screw follower threadingly secured to said right hand threaded section of said drive screw; said first and second screw followers slidably mounted on said sliding track member; and c) said first leg is pivotally secured at said first end to said first screw follower and said second leg is pivotally, secured at said first end to said second screw follower.

16. The stabilizing jack as in claim 15 wherein said drive screw is rotatably mounted on bearings fixedly secured to said sliding track member such that said drive screw does not slide relative to said sliding track member.

17. The stabilizing jack as in claim 15 and further including:

a) a motor mounting plate secured to a first end of said sliding track member; and b) a motor connected to said motor mounting plate and selectively rotating said drive screw.

18. The stabilizing jack as in claim 17 and further including a deflector plate connected to said motor mounting plate so as to present an inclined surface to a second end of the one of said first and second legs nearest to said first end of said sliding track member as said one leg moves from said retracted position to said extended position, said deflector plate guiding said one leg second end past said motor mounting plate to prevent damage to said motor mounting plate.

19. A stabilizing jack for use with a vehicle comprising:

a) a stationary track member securable to said vehicle, said stationary track member comprising a first elongated channel member including a first web with first and second sidewalls depending therefrom and first and second track flanges extending inward from lower ends of said first and second sidewalls in spaced apart relation to form a first guide slot extending therebetween, said first and second track flanges each having an upper surface;

b) a sliding track member slidably secured to said stationary track member between said first and second sidewalls above said first and second track flanges;

c) a drive screw rotatably mounted to said sliding track member and having a left hand threaded section and a right hand threaded section;

d) a first screw follower threadingly secured to said left hand threaded section of said drive screw and a second screw follower threadingly secured to said right hand threaded section of said drive screw; said first and second screw followers slidably mounted on said sliding track member; and e) first and second legs pivotally mounted at first ends thereof to said first and second screw followers respectively such that advancement of each of said first and second screw followers between a first position and a second position, by rotation of said drive screw, pivots said first and second legs respectively between a retracted position and an extended position.

20. The stabilizing jack as in claim 19 and further including:

a) a motor mounting plate secured to a first end of said sliding track member; and b) a motor connected to said motor mounting plate and selectively rotating said drive screw.

21. The stabilizing jack as in claim 20 and further including a deflector plate connected to said motor mounting plate so as to present an inclined surface to a second end of the one of said first and second legs nearest to said first end of said sliding track member as said one leg moves from said retracted position to said extended position, said deflector plate guiding said one leg second end past said motor mounting plate to prevent damage to said motor mounting plate.

22. A stabilizing jack for use with a vehicle comprising:

a) a stationary track member securable to said vehicle, said stationary track member having first and second track flanges supported in spaced relation below an upper surface thereof, said first and second track flanges extending in spaced apart relation to form a first guide slot extending therebetween;

b) a sliding track member slidably secured to said stationary track member on said first and second track flanges, said sliding track member comprising an elongated channel member including a web with opposed sidewalls depending therefrom and third and fourth track flanges extending inward from lower ends of said sidewalls in spaced apart relation to form a second guide slot extending therebetween, said third and fourth track flanges supported on said first and second track flanges of said stationary track member;

c) first and second linear actuators mounted to said sliding track member; and d) first and second legs pivotally mounted at first ends thereof to said first and second linear actuators respectively and extending through said second guide slot such that advancement of each of said first and second linear actuators between a first position and a second position pivots said first and second legs respectively between a retracted position and an extended position.

23. The stabilizing jack as in claim 22 wherein said first and second linear actuators comprise:

a) a drive screw rotatably mounted to said sliding track member and having a left hand threaded section and a right hand threaded section;

b) a first screw follower threadingly secured to said left hand threaded section of said drive screw and a second screw follower threadingly secured to said right hand threaded section of said drive screw; said first and second screw followers slidably mounted relative to said sliding track member; and c) said first leg is pivotally secured at said first end to said first screw follower and said second leg is pivotally secured at said first end to said second screw follower.

24. The stabilizing jack as in claim 23 wherein said drive screw is rotatably mounted on bearings fixedly secured to said sliding track member such that said drive screw does not slide relative to said sliding track member.

25. The stabilizing jack as in claim 22, and further including bearings interposed between said first and second track flanges of said stationary track member and the respective third and fourth track flanges of said sliding frame member.

26. The stabilizing jack as in claim 25 wherein said bearings are composed of ultra high molecular weight plastic.

* * * * *